United States Patent
Fein et al.

(10) Patent No.: US 7,636,763 B1
(45) Date of Patent: Dec. 22, 2009

(54) MIXED NETWORK ARCHITECTURE IN DATA FORWARDING STORAGE

(76) Inventors: Gene Fein, 29712 Zuma Bay Way, Malibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

(21) Appl. No.: 12/241,032

(22) Filed: Sep. 29, 2008

(51) Int. Cl.
*G06F 15/167* (2006.01)

(52) U.S. Cl. ...................................... 709/212

(58) Field of Classification Search ................. 709/251, 709/212; 710/100
See application file for complete search history.

(56) References Cited

U.S. PATENT DOCUMENTS

| | | | | |
|---|---|---|---|---|
| 5,787,258 A * | 7/1998 | Costa et al. | ................. | 709/251 |
| 6,151,395 A * | 11/2000 | Harkins | ........................ | 380/286 |
| 6,684,258 B1 * | 1/2004 | Gavin et al. | ................. | 709/251 |
| 7,143,170 B2 * | 11/2006 | Swildens et al. | ............. | 709/226 |
| 7,404,002 B1 * | 7/2008 | Pereira | ........................ | 709/231 |
| 7,424,514 B2 | 9/2008 | Noble et al. | ................. | 709/205 |
| 7,426,637 B2 | 9/2008 | Risan et al. | ................. | 713/165 |
| 2002/0194371 A1 * | 12/2002 | Kadoi | ......................... | 709/239 |
| 2004/0223503 A1 * | 11/2004 | Lynch et al. | ................. | 370/404 |
| 2005/0201409 A1 * | 9/2005 | Griswold et al. | ............. | 370/445 |
| 2005/0243823 A1 * | 11/2005 | Griswold et al. | ............. | 370/389 |
| 2006/0031593 A1 * | 2/2006 | Sinclair | ....................... | 709/251 |
| 2007/0195772 A1 * | 8/2007 | Shadish | ........................ | 370/390 |
| 2008/0222415 A1 | 9/2008 | Munger et al. | ............... | 713/168 |
| 2009/0067322 A1 * | 3/2009 | Shand et al. | ................. | 370/225 |

FOREIGN PATENT DOCUMENTS

WO     A 2008/108699     9/2008

* cited by examiner

*Primary Examiner*—J Bret Dennison
(74) *Attorney, Agent, or Firm*—Greenberg Traurig, LLP; Chinh H. Pham

(57) ABSTRACT

Methods and apparatus, including computer program products, for a mixed network architecture in data forwarding storage. A method includes two or more networks of interconnected computer system nodes, in which the networks include at least one private network and one public network. A request can be received from a source system linked to a central server to store data. The method further includes determining whether to forward the data to a computer memory in the private network or the public network or a combination of private and public networks, directing the data to the computer memory in the determined network, and continuously forwarding the data from the computer memory to other computer memories in the determined network without storing on any physical storage device in the first network.

20 Claims, 4 Drawing Sheets

MIXED NETWORK ARCHITECTURE IN DATA FORWARDING STORAGE

CROSS-REFERENCES TO RELATED APPLICATIONS

The present patent application is related to U.S. Ser. No. 12/046,757, filed on Mar. 12, 2008; U.S. Ser. No. 12/052,345, filed on Mar. 20, 2008; U.S. Ser. No. 12/132,804, filed Jun. 4, 2008; U.S. Ser. No. 12/099,498, filed on Apr. 8, 2008; U.S. Ser. No. 12/109,458, filed Apr. 25, 2008; U.S. Ser. No. 12/116,610, filed May 7, 2008; U.S. Ser. No. 12/170,901, filed Jul. 10, 2008; U.S. Ser. No. 12/170,925, filed on Jul. 10, 2008; U.S. Ser. No. 12/184,866, filed on Aug. 1, 2008; U.S. Ser. No. 12/240,951, filed on Sep. 29, 2008; U.S. Ser. No. 12/241,003, filed on Sep. 29, 2008; U.S. Ser. No. 12/240,925, filed on Sep. 29, 2008; U.S. Ser. No. 12/240,991, filed on Sep. 29, 2008; U.S. Ser. No. 12/240,967, filed on Sep. 29, 2008; U.S. Ser. No. 12/240,885, filed on Sep. 29, 2008; and U.S. Ser. No. 12/240,757, filed on Sep. 29, 2008.

BACKGROUND

At least some embodiments disclosed herein relate to data storage, and more particularly, to a mixed network architecture in data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for a mixed network architecture in data forwarding storage.

In general, in one aspect, the invention features a method including, in two or more networks of interconnected computer system nodes, the networks including at least one private network and one public network, receiving a request from a source system linked to a central server to store data, determining whether to forward the data to a computer memory in the private network or the public network, directing the data to the computer memory in the determined network, continuously forwarding the data from the computer memory to other computer memories in the determined network without storing on any physical storage device in the first network. Continuously forwarding includes determining an address of a node available in the determined network to receive the data based on one or more factors, and sending a message to the source system with the address of a specific node in the determined network for the requester to forward the data.

In another aspect, the invention features a system including a group of interconnected computer system nodes, one subset of nodes grouped together as a private network and one subset of nodes grouped together as a public network, each node receiving data and continuously forwarding the data from computer memory to computer memory without storing on any physical storage device in response to a request to store data from a requesting system and retrieve data being continuously forwarded from computer memory to computer memory in response to a request to retrieve data from the requesting system, each node further configured to detect the presence of data in its memory, apply a time stamp, and forward the data to computer memory of another node in the interconnected computer systems nodes according to a node's availability.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous redundant data forwarding system, i.e., data are stored by continually forwarding it from one node memory to another node memory.

Figure 1:
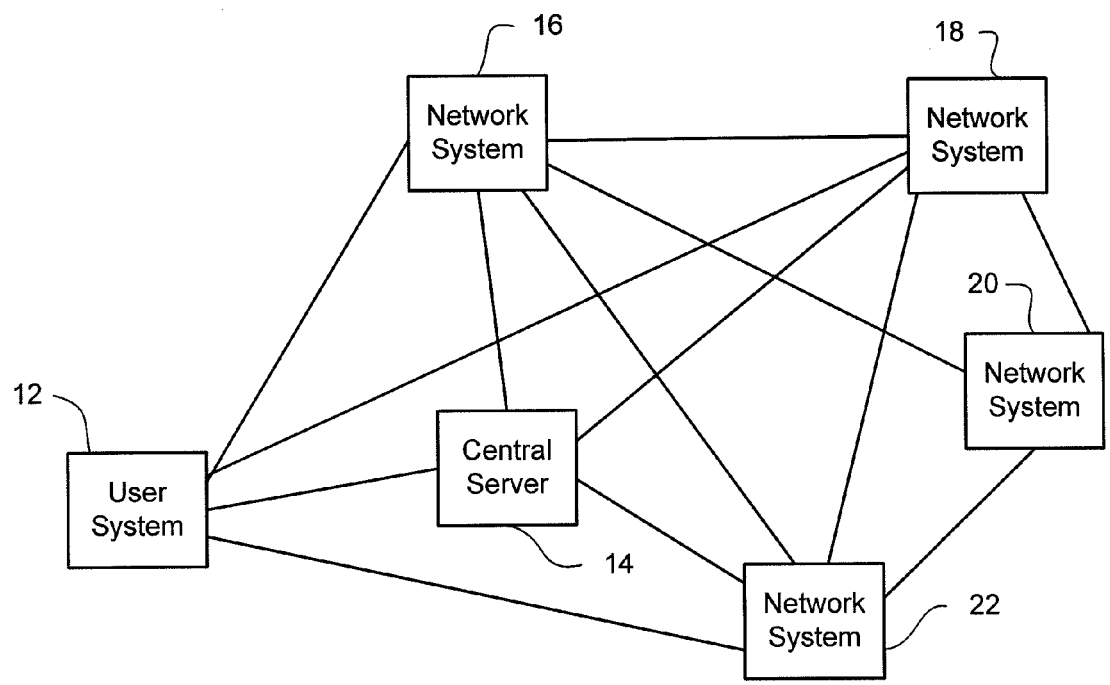
FIG. 1 is a block diagram of an exemplary system.

As shown in FIG. 1, an exemplary system 10 includes a user system 12 and a number of network systems 14, 16, 18, 20, 22. Each of the network systems 14, 16, 18, 20, 22 can be considered to be a node in the system 10 and one such network system may be designated as a central server, such as network system 14, which may assume a control position in system 10. Each of the nodes 14, 16, 18, 20, 22 may be established as a privately controlled network of peers under direct control of the central server 14. Peered nodes may also be a mix of private and public nodes, and thus not under the direct physical control of the central server 14. The system 10 may also be wholly public where the central server 14 (or servers) has no direct ownership or direct physical control of any of the peered nodes.

As a privately controlled network a user may have free access to the peered nodes or paid access through a subscription service or other arrangement. In a mixed environment, i.e., a network having a combination of private and public nodes, the central server 14 can dictate whether data is to be forwarded to the private network or the public network. In one example, the central server 14 identifies the type of data and forwards the data to the private network or public network according to identified type. For example, data that represents video or audio files may be sent to the public network while data that represents documents (e.g., a Microsoft® Word document) may be sent to the private network.

In another example, the central server 14 enables a user to select where user-owned data is to be forwarded, i.e., to the private network or the public network.

In one example, nodes 14, 16, 18, 20 and 22 can be considered a private network. In a private network, an administrator controls the nodes and may designate which node is the central server. The system 10 can also include one or more additional nodes. For example, nodes 24, 26 and 28. These nodes 24, 26 and 28 may be considered to be part of one or more public networks in which the administrator has little or no control.

Figure 2:
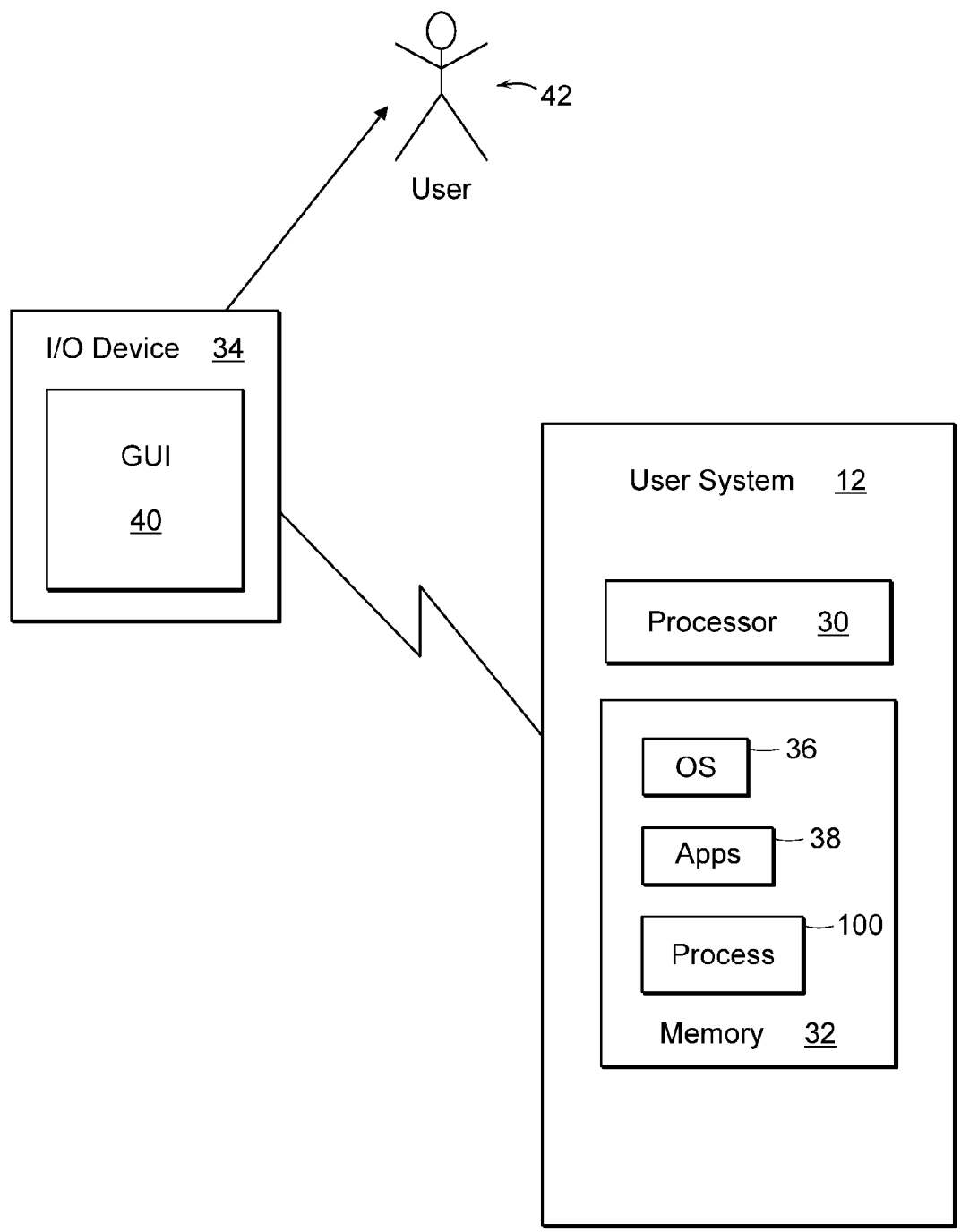
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
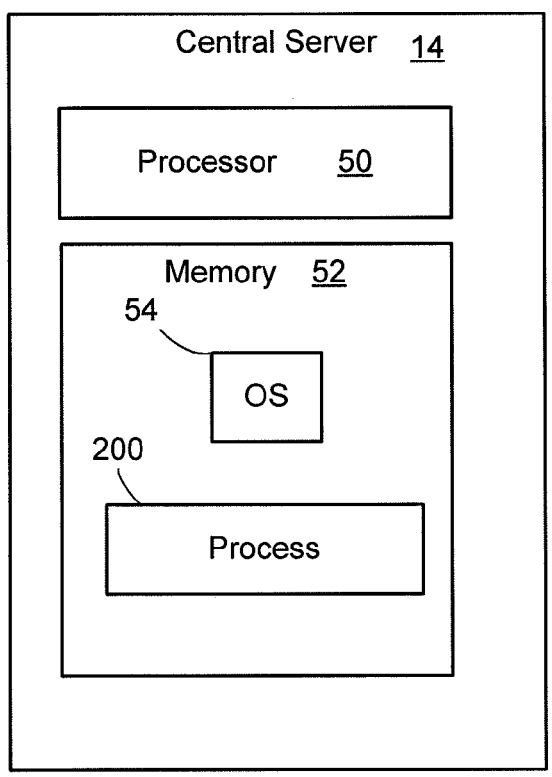
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices, and copies of data, which are used to provide redundancy, are stored locally or on remote physical storage devices such as disk drives. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data and does not use physical data storage to provide data redundancy. When a request to store data is received by the central server 14 from storage process 100, data is directed by the central server 14 to a node in the system 10 where it is then continuously forwarded from node memory to node memory in the system 10 by the data forwarding process 200 in each of the network nodes without storing on any physical storage medium such as a disk drive. The forwarded data resides only for a very brief period of time in the memory of any one node in the system 10. Data are not stored on any physical storage medium in any network node.

As described above, the central server 14 can direct data to a private network, and public network, or a combination of private and public networks. And as described above, a requester may indicate to the central server 14 that one particular type of data be directed to a private network while another particular type of data be directed to a public network. Forwarding to a public network may require a requester to pay a subscription. The central server 14 can also analyze the data to be forwarded and send the data to a private or public network depending, for example, on type or a preference of a requester.

When a request to retrieve data is received by the central server 14 from storage process 100, the requested data, which is being forwarded from node memory to node memory in the system 10, is retrieved.

Data forwarded in this manner can be segmented and segments forwarded as described above. Still, the segmented data is not stored on any physical storage medium in any network node, but merely forwarded from the memory of one node to the memory of another node.

Figure 4:
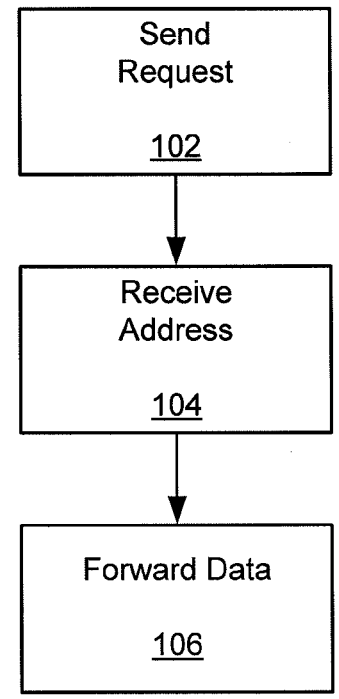
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address.

Figure 5:
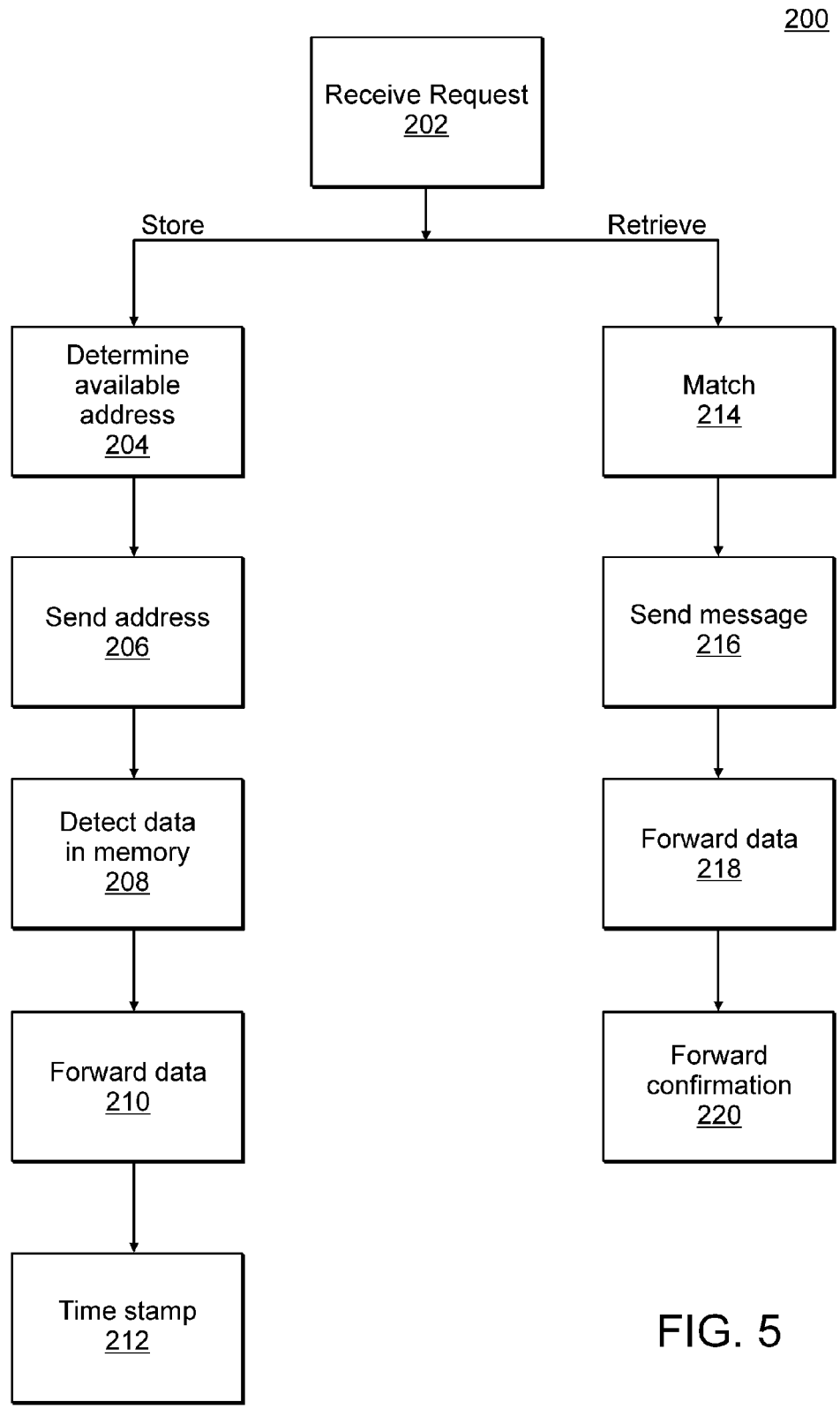
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in a computer readable medium, e.g., in a machine readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   in two or more networks of interconnected computer system nodes, the networks including at least one private network and one public network, receiving a request from a source system linked to a central server to store at least one data item;
   determining whether to forward the at least one data item to a node in the private network or the public network or a combination of private and public networks;

directing the at least one data item to the node in the determined network;

in response to the request from the source system, continuously forwarding the at least one data item among the computer system nodes in the determined network without storing the forwarded at least one data item on any fixed storage medium in the determined network, the forwarded at least one data item being constantly routed within the determined network from node to node, the forwarded at least one data item being available for retrieval if a request to retrieve the at least one data item is received, continuously forwarding comprising:

determining an address of a node available in the determined network to receive the at least one data item based on one or more factors; and sending a message to the source system with the address of a specific node in the determined network for the source system to forward the at least one data item.

2. The method of claim 1 wherein the continuously forwarding further comprises applying a time stamp to the at least one data item at the specific node in the determined network.

3. The method of claim 1 wherein the one or more factors comprise network traffic analysis and available memory.

4. The method of claim 1 wherein continuously forwarding further comprises:

detecting a presence of the at least one data item at the specific node of the determined network; and forwarding the at least one data item to another node in the determined network without storing the forwarded at least one data item on any fixed storage medium.

5. The method of claim 1 wherein determining whether to forward the at least one data item to a node in the private network or the public network comprises:

identifying a type of the at least one data item; and selecting the public network or the private network according to the identified data type.

6. The method of claim 1 wherein determining whether to forward the at least one data item to a node in the private network or the public network comprises:

identifying whether an owner of the at least one data item is a paid subscriber;

selecting the private network if the owner is a paid subscriber; and selecting the public network if the owner is not a paid subscriber.

7. The method of claim 1 wherein determining whether to forward the at least one data item to a node in the private network or the public network comprises:

identifying whether an owner of the at least one data item is a paid subscriber;

identifying a type of the at least one data item;

selecting the private network if the owner has designated the identified data type for the private network; and selecting the public network if the owner has designated the identified data type for the public network.

8. The method of claim 1 further comprising a plurality of private and public networks.

9. A tangible computer readable medium embodying instructions for causing a data processing apparatus to perform a method for storing data items in a network of interconnected computer system nodes, the method comprising:

in two or more networks of interconnected computer system nodes, the networks including at least one private network and one public network, receiving a request from a source system linked to a central server to store at least one data item;

determining whether to forward the at least one data item to a node in the private network or the public network or a combination of public and private networks;

directing the at least one data item to the node in the determined network;

in response to the request from the source system, continuously forwarding the at least one data item among the computer system nodes in the determined network without storing the forwarded at least one data item on any fixed storage medium in the determined network, the forwarded at least one data item being constantly routed within the determined network from node to node, the forwarded at least one data item being available for retrieval if a request to retrieve the at least one data item is received, continuously forwarding comprising:

determining an address of a node available in the determined network to receive the at least one data item based on one or more factors; and sending a message to the source system with the address of a specific node in the determined network for the source system to forward the at least one data item.

10. The computer readable medium of claim 9 wherein the one or more factors comprise network traffic analysis and available memory.

11. The computer readable medium of claim 9 wherein continuously forwarding further comprises:

detecting a presence of the at least one data item at the specific node of the determined network; and forwarding the at least one data item to another node in the determined network without storing the forwarded at least one data item on any fixed storage medium.

12. The computer readable medium of claim 9 determining whether to forward the at least one data item to a node in the private network or the public network comprises:

identifying a type of the at least one data item;

selecting the public network or the private network according to the identified data type.

13. The computer readable medium of claim 9 wherein determining whether to forward the at least one data item to a node in the private network or the public network comprises:

identifying whether an owner of the at least one data item is a paid subscriber;

selecting the private network if the owner is a paid subscriber; and selecting the public network if the owner is not a paid subscriber.

14. The computer readable medium of claim 9 wherein determining whether to forward the at least one data item to a node in the private network or the public network comprises:

identifying whether an owner of the at least one data item is a paid subscriber;

identifying a type of the at least one data item;

selecting the private network if the owner has designated the identified data type for the private network; and selecting the public network if the owner has designated the identified data type for the public network.

15. A system comprising:

a group of interconnected computer system nodes, one subset of nodes grouped together as a private network and one subset of nodes grouped together as a public network, each node receiving at least one data item and in response to a request to store the at least one data item from a requesting system, continuously forwarding the at least one data item among the nodes without storing the forwarded at least one data item on any fixed storage medium, the forwarded at least one data item being constantly routed from node to node; and in response to a request to retrieve the at least one data item from the requesting system, retrieving the at least one data item being continuously forwarded among the nodes, each node further configured to detect the presence of the at least one data item, apply a time stamp, and forward the at least one data item to another node in the group of interconnected computer systems nodes according to a node's availability.

16. The system of claim 15 wherein the group of nodes comprises a central server that matches the data item retrieval request using a hash mark representing the at least one data item entering a node, sends a message to a node that is predicted to have the at least one data item, the message instructing the node to forward the at least one data item to the requesting system, and receives a confirmation message that the at least one data item has been forwarded to the requesting system.

17. The network of claim 16 wherein the central server controls whether the at least one data item is forwarded to the private network or the public network.

18. The system of claim 17 wherein the central server identifies a type of the at least one data item and selects the public network or the private network according to the identified data type.

19. The system of claim 17 wherein the central server identifies whether an owner of the at least one data item is a paid subscriber, selects the private network if the owner is a paid subscriber, and selects the public network if the owner is not a paid subscriber.

20. The system of claim 17 wherein the central server identifies whether an owner of the at least one data item is a paid subscriber, identifies a type of the at least one data item, selects the private network if the owner has designated the identified data type for the private network, and selects the public network if the owner has designated the identified data type for the public network.

* * * * *